US009226337B1

(12) United States Patent
Kopikare et al.

(10) Patent No.: US 9,226,337 B1
(45) Date of Patent: *Dec. 29, 2015

(54) METHOD AND APPARATUS FOR ESTABLISHING CONNECTIONS IN A WIRELESS NETWORK

(71) Applicant: MARVELL INTERNATIONAL LTD., Hamilton (BM)

(72) Inventors: Milind Kopikare, Cupertino, CA (US); Raja Banerjea, Sunnyvale, CA (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/045,488

(22) Filed: Oct. 3, 2013

Related U.S. Application Data

(63) Continuation of application No. 12/606,167, filed on Oct. 26, 2009, now Pat. No. 8,570,898.

(60) Provisional application No. 61/108,204, filed on Oct. 24, 2008, provisional application No. 61/109,017, filed on Oct. 28, 2008, provisional application No. 61/112,010, filed on Nov. 6, 2008.

(51) Int. Cl.
*H04W 84/20* (2009.01)
(52) U.S. Cl.
CPC .................................... *H04W 84/20* (2013.01)
(58) Field of Classification Search
USPC ........................................................ 370/254
See application file for complete search history.

(56) References Cited

U.S. PATENT DOCUMENTS

| 5,740,167 | A  | 4/1998  | Taketsugu et al.  |
| 7,512,089 | B2 | 3/2009  | Wybenga et al.    |
| 7,515,945 | B2 | 4/2009  | Ruuska et al.     |
| 7,535,884 | B2 | 5/2009  | Stephenson et al. |
| 7,599,346 | B2 | 10/2009 | Brommer           |
| 7,814,322 | B2 | 10/2010 | Gurevich et al.   |
| 8,139,553 | B2 | 3/2012  | Chang et al.      |

(Continued)

OTHER PUBLICATIONS

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, The Institute of Electrical and Electronics Engineers, Inc., (Jun. 12, 2007).

(Continued)

*Primary Examiner* — Edan Orgad
*Assistant Examiner* — Emmanuel Maglo

(57) ABSTRACT

A first communication device listens, during advertise states of the first communication device, for probe requests from one or more second communication devices on a first channel included in a plurality of channels. At least some respective lengths of the advertise states of the first communication device are different. When one or more first probe requests are received from the one or more second communication devices during the advertise states of the first communication device, the first communication device transmits one or more first probe responses responsive to the one or more first probe requests. The first communication device transmits second probe requests on respective second channels during respective search states of the first communication device, and listens, during the search states, for one or more second probe responses on the second channels.

30 Claims, 11 Drawing Sheets

(56) References Cited

U.S. PATENT DOCUMENTS

| | | | |
|---|---|---|---|
| 2002/0147819 | A1 | 10/2002 | Miyakoshi et al. |
| 2005/0053015 | A1 | 3/2005 | Jin et al. |
| 2007/0171922 | A1 | 7/2007 | Jabri et al. |
| 2007/0237210 | A1 | 10/2007 | Voglewede et al. |
| 2007/0297352 | A1 | 12/2007 | Jabri et al. |
| 2008/0092204 | A1 | 4/2008 | Bryce et al. |
| 2009/0103501 | A1 | 4/2009 | Farrag et al. |
| 2009/0310619 | A1 | 12/2009 | Brommer |
| 2013/0148545 | A1* | 6/2013 | Jung et al. ............ 370/255 |
| 2013/0322297 | A1* | 12/2013 | Dominguez ............ 370/255 |
| 2014/0254422 | A1 | 9/2014 | Mehta |

OTHER PUBLICATIONS

"IEEE P802.11 n™/D3.00, Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," The Institute of Electrical and Electronics Engineers, Inc., Sep. 2007.

"IEEE Std. 802.11 n™ IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," The Institute of Electrical and Electronics Engineers, Inc., Oct. 2009.

International Standard, ISO/IEC 8802-11, ANSI/IEEE Std 802.11, "Information technology—Telecommunications and information exchange between systems—local and metropolitan area networks—specific requirement" Part 11: Wireless LAN Medium Access Control (MAC) and Physical Layer (PHY) specifications, The Institute of Electrical and Electronics Engineers, Inc., (1999).

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHz Band," The Institute of Electrical and Electronics Engineers, Inc., (1999).

IEEE Std 802.11b-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band—Corrigendum 1," The Institute of Electrical and Electronics Engineers, Inc., Nov. 7, 2001.

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Futher Higher Data Rate Exension in the 2.4 GHz Band," The Institute of Electrical and Electronics Engineers, Inc., Apr. 2003.

S. A. Mujtaba, "IEEE P802.11—Wireless LANs, TGn Sync Proposal Technical Specification," The Institute of Electrical and Electronics Engineers, Inc., doc.: IEEE 802.11-04/0889r6, May 2005.

* cited by examiner

METHOD AND APPARATUS FOR ESTABLISHING CONNECTIONS IN A WIRELESS NETWORK

CROSS REFERENCES TO RELATED APPLICATIONS

This application is a continuation of U.S. patent application Ser. No. 12/606,167, filed Oct. 26, 2009, now U.S. Pat. No. 8,570,898, which claims the benefit of U.S. Provisional Patent Application Nos. 61/108,204 and 61/109,017, filed Oct. 24, 2008 and Oct. 28, 2008, respectively, both entitled "Master Negotiation," and to U.S. Provisional Patent Application No. 61/112,010, filed Nov. 6, 2008, entitled "Find and Master Negotiation." The disclosures of all of the applications referenced above are hereby incorporated herein by reference in their entireties for all purposes.

FIELD OF THE DISCLOSURE

The present disclosure relates generally to communication systems and, more particularly, to establishing connections in wireless communication systems.

BACKGROUND

An ever-increasing number of relatively inexpensive, low power wireless data communication services, networks and devices have been made available over the past number of years, promising near wire speed transmission and reliability. Various wireless technologies is described in detail in the IEEE 802.11 Standards, including for example, the IEEE Standards 802.11a, 802.11b, and 802.11g and their updates and amendments, as well as the IEEE Standard 802.11n now in the process of being adopted, all of which are collectively incorporated herein fully by reference. These standards and draft standards specify various methods of establishing connections between wireless devices. For example, in an infrastructure mode, wireless devices must first connect with a wireless access point and all communications occur via the access point. On the other hand, in an ad hoc mode, wireless devices can connect and communicate with each other directly, as opposed to communicating via an access point.

SUMMARY

In one embodiment, a first communication device comprises a wireless communication module. The wireless communication module includes a transceiver, and a hardware controller device. The hardware controller device is configured to: cause the wireless communication module to listen, during advertise states of the first communication device, for probe requests from one or more second communication devices on a first channel included in a plurality of channels, wherein at least some respective lengths of the advertise states of the first communication device are different, when one or more first probe requests are received from the one or more second communication devices during the advertise states of the first communication device, cause the wireless communication module to transmit one or more first probe responses responsive to the one or more first probe requests, cause the wireless communication module to select second channels from the plurality of channels for use during search states of the first communication device, wherein the second channels are different than the first channel, cause the wireless communication module to transmit second probe requests on respective second channels during respective search states of the first communication device, and cause the wireless communication module to listen, during the search states, for one or more second probe responses on the second channels.

In another embodiment, a system comprises a first communication device and a second communication device. The first communication device comprises a first wireless communication module including a first transceiver, and a first hardware controller device. The first hardware controller device is configured to cause the first wireless communication module to listen, during advertise states of the first communication device, for probe requests on a first channel included in a plurality of channels, wherein at least some respective lengths of the advertise states of the first communication device are different, when a first probe request is received during any of the advertise states of the first communication device, cause the first wireless communication module to transmit a first probe response responsive to the first probe request, cause the first wireless communication module to select second channels from the plurality of channels for use during search states of the first communication device, wherein the second channels are different than the first channel, cause the first wireless communication module to transmit second probe requests on respective second channels during respective search states of the first communication device, and cause the first wireless communication module to listen, during the search states of the first communication device, for one or more second probe responses on the second channels. The second communication device comprises a second wireless communication module including a second transceiver, and a second hardware controller device. The second hardware controller device is configured to cause the second wireless communication module to listen, during advertise states of the second communication device, for probe requests on a third channel included in a plurality of channels, wherein at least some respective lengths of the advertise states of the second communication device are different, when a third probe request is received during any of the advertise states of the second communication device, cause the second wireless communication module to transmit a third probe response responsive to the third probe request, cause the second wireless communication module to select fourth channels from the plurality of channels for use during search states of the second communication device, wherein the fourth channels are different than the third channel, cause the second wireless communication module to transmit fourth probe requests on respective fourth channels during respective search states of the second communication device, and cause the second wireless communication module to listen, during the search states of the second communication device, for one or more fourth probe responses on the fourth channels.

In yet another embodiment, a method includes listening, at a first communication device, for probe requests from one or more second communication devices on a first channel included in a plurality of channels during advertise states of the first communication device, wherein at least some respective lengths of the advertise states of the first communication device are different. The method also includes, when one or more first probe requests are received from the one or more second communication devices during the advertise states of the first communication device, transmitting, with the first communication device, one or more first probe responses responsive to the one or more first probe requests. The method additionally includes selecting, at the first communication device, second channels from the plurality of channels for use during search states of the first communication device, wherein the second channels are different than the first channel. The method further includes transmitting, with the first communication device, second probe requests on respective second channels during respective search states of the first communication device, and listening, at the first communication device, for one or more second probe responses on the second channels during the search states of the first communication device.

DETAILED DESCRIPTION

In many wireless communication networks, such as networks operating according to one of the IEEE 802.11 standards or draft standards, a radio frequency (RF) band may be partitioned into channels. If wireless devices in the network are configured to communicate on different channels, the devices may have difficulty discovering each other. The present disclosure describes example techniques that wireless devices may utilize to discover other devices in a wireless network that has multiple channels.

Additionally, in some communication protocols for wireless networks, one device can be designated a "master" whereas other devices are designated as "clients." If there is not a typical access point device in such a network, a user device, such as a desktop computer, a laptop computer, a personal digital assistant with wireless local area network (WLAN) or personal area network (PAN) communication capabilities, a mobile phone with WLAN or PAN capabilities, may be designated the master of a network. The master typically manages communications in the network. The present disclosure describes example techniques that wireless devices can utilize to negotiate and determine which device will be designated the master.

Figure 1:
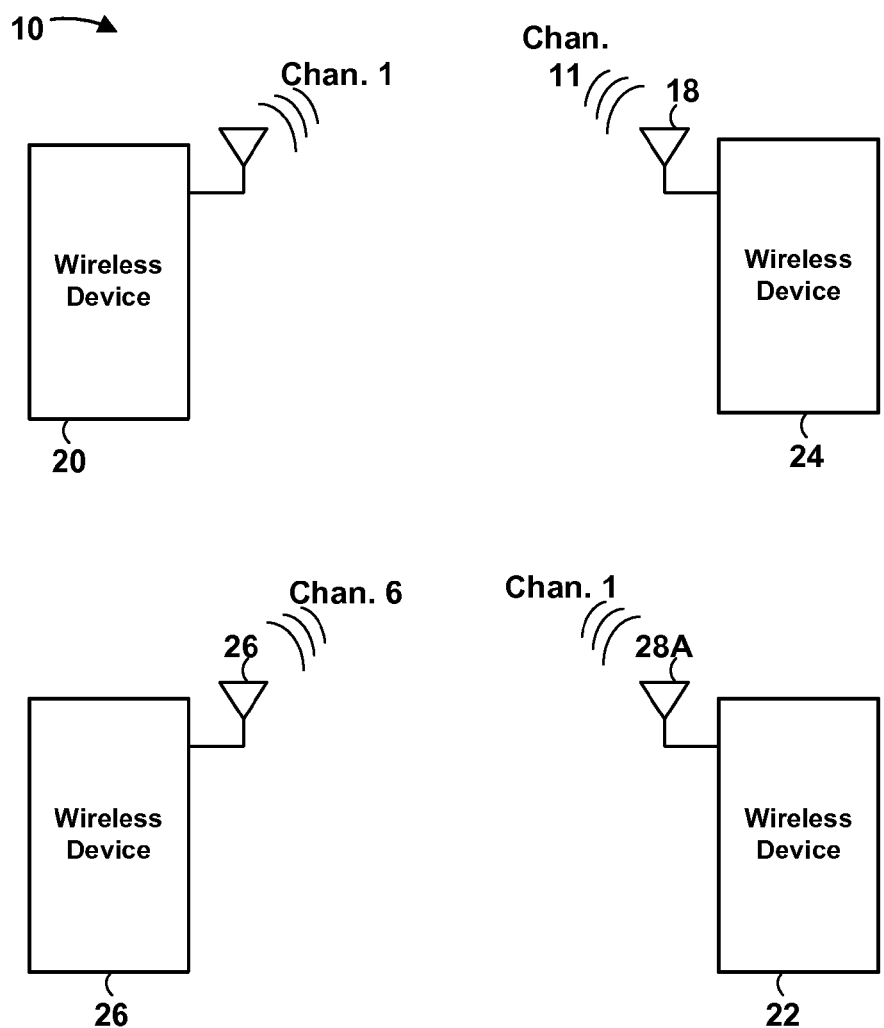
FIG. 1 is a block diagram of an example network in which wireless devices operating on different channels look to connect with one or more other devices.

FIG. 1 is a block diagram of an example network 10 in which wireless devices, such as devices capable of peer-to-peer (P2P) or ad hoc network communication, attempt to establish connections with other devices in the network 10. The network 10 can include devices of various types that are capable of WLAN or PAN communication, such as access points, routers, desktop computers, laptop computers, personal digital assistants (PDAs), mobile telephones, audio playback devices, digital video playback devices, cameras, televisions, network storage devices, printers, copiers, keyboards, etc. In particular, FIG. 1 shows devices 20, 22, 24, 26 operating on different channels. Although FIG. 1 illustrates four devices each with only one antenna, the network 10, may, of course, include any number of devices, each equipped with the same or a different number of antennas (e.g. 1, 2, 3, 4 antennas and so on).

Figure 2:
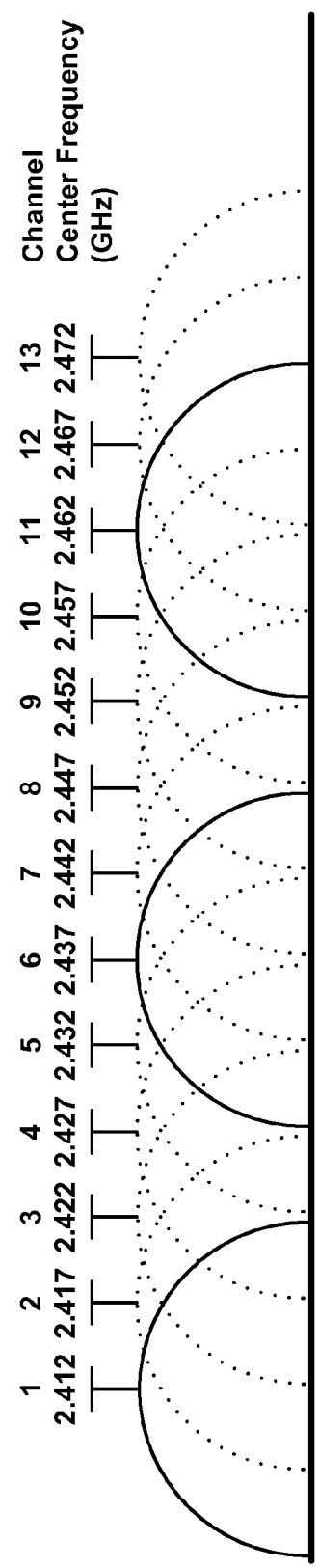
FIG. 2 is an example frequency band that has been divided into channels.

As discussed above, a frequency band can be subdivided into sub-bands, often referred to as channels. For example, IEEE Standard 802.11b and the IEEE Standard 802.11g subdivide a frequency band at 2.4 GHz (the 2.4 GHz band) into 13 channels. FIG. 2 is diagram illustrating the channel structure defined by the IEEE Standard 802.11b and the IEEE Standard 802.11g. Each channel of the 2.4 GHz band has a width of 22 MHz but is spaced only 5 MHz apart from adjacent channels. Channel 1 is centered at 2.412 GHz and channel 13 is centered at 2.472 GHz.

The channel on which a wireless device operates may be selected by a user, preselected by a vendor, may be selected based on a particular application that is running on the device, etc. Two devices that are operating on different channels cannot connect with each other. In order to connect, one of the devices can switch to the channel of the other device, or the two devices may switch to a third channel.

With a channel structure such as illustrated in FIG. 2, devices in a wireless network often will choose a channel on which to operate from a set of non-overlapping channels in an attempt to avoid interfering with other nearby networks. For example, the channels 1, 6, and 11 of FIG. 2 form a set of non-overlapping channels, and these channels are often referred to as "social channels."

Referring again to FIG. 1, the network 10 may operate according to one of a variety of communication protocols. As just one example, network 10 may operate according to a wireless ad hoc topology. Wireless ad hoc networks, e.g., a peer-to-peer (P2P) network, permit devices to communicate directly between each other as opposed to communicating via an access point. This P2P network design is commonly used to connect a number of P2P devices. Network 10 may operate according to a variety of different topologies. For example, devices 20, 22, 24, and 26 may communicate with each other via multiple one-to-one links. For instance, in one implementation, respective communication links exist between devices 20 and 22, devices 20 and 24, devices 20 and 26, devices 22 and 24, devices 22 and 26, and devices 24 and 26. As another example, one of the devices 20, 22, 24, and 26 may serve as a central point (e.g., a piconet central point, an access point, etc.), and the other non-central point devices 20, 22, 24, and 26 may have communication links only to the central point. In one implementation, each non-central point device can only communicate with the central point. For example, if device 20 is the central point, devices 22 and 24 cannot communicate with each other. In another implementation, a non-central point device can communicate with other non-central point devices via the central point. For example, if device 20 is the central point, devices 22 and 24 can communicate with each other via device 20.

Referring again to FIG. 1, if device 20, operating on channel 1, and device 24, operating on channel 11, are to connect with each other, the devices 20, 24 must first be able to discover one another. In order for two devices operating on different channels to discover each other, the devices can toggle between a listen or advertise state and a search state. In the advertise state, each device advertises its operating channel to other devices that are in a search state. In the search state a device sends signals known as probe requests on known channels such as the social channels discussed above with respect to FIG. 2. Probe requests are sent from a device to request information about another device. For example, a probe request can be sent from a device using a social channel. The probe request can prompt other devices in the area to transmit to the requesting device information such as the device type of the responding device and a parameter indicating a priority that the responding device be a master in a master-client relationship (sometimes referred to herein as a master intent value (MIV)). The amount of time a device is in an advertise state may be changed (e.g., randomized) each time the device enters the advertise state so that convergence (discovery) of another device may occur faster. For example, if two devices operating on different channels both happen to begin in a search state at about the same time and then switch to the advertise state for the same amount of time, the devices may never discover each other. In other words, if the advertise states and search states of two devices happen to be synchronized, the devices may never discover each other because one device may never be searching when the other device is advertising. However, if the timing of the advertise states and search states of two devices is different and/or unsynchronized, the chances of discovery improve. For example, the length of the search state and/or the length of the advertise state can be randomized (i.e., the length is randomly or pseudo-randomly varied) so that the length changes each time the state occurs. As another example, the length of the listen state and/or the length of the advertise state can be randomized so that the length changes every n times the state occurs, where n is a positive integer greater than one.

Figure 3:
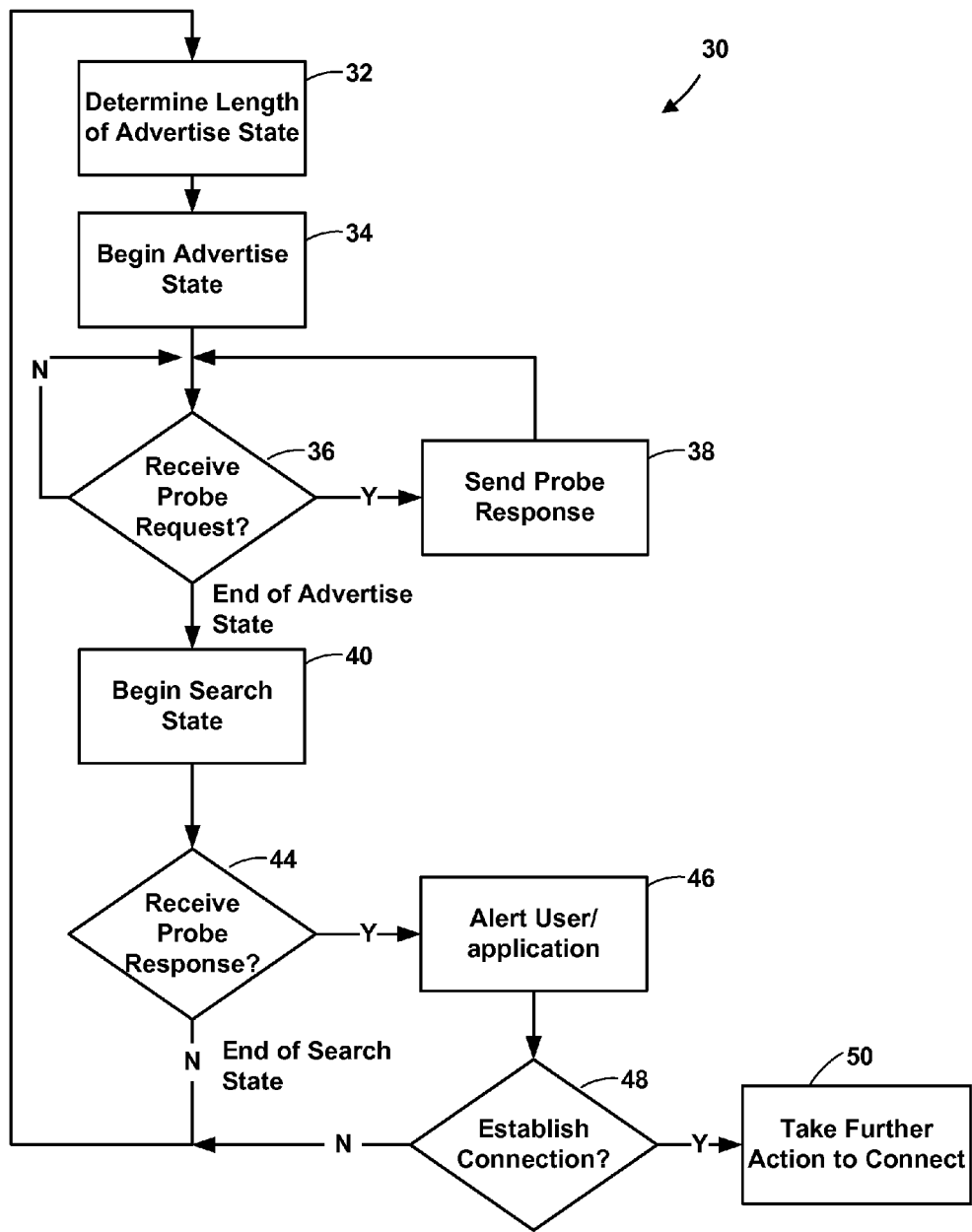
FIG. 3 is a flow diagram of an example method that may be implemented by a wireless device in a network to discover other devices in the network.

FIG. 3 is a flow diagram of an example method 30 that can be implemented by a wireless device in a network such as the network 10 to discover other devices in the network. At block 32, the length of an advertise state is determined. For example, the length can be randomly or pseudo-randomly determined. At block 34, the device enters an advertise state. In the advertise state, the device will listen for probe requests sent by other devices. If, during the advertise state, a probe request is received (block 36), the device transmits a probe response to the requesting device (block 38). As discussed above, the probe response includes information, such as device type, an MIV value, etc., to facilitate making a connection. After sending a probe response, and while still in the advertise state, the device can continue to listen for further probe requests and respond to such further probe requests. Alternatively, in some implementations, the device can stop responding to further probe requests. In such cases, device 20 proceeds to a wait state until further transmissions are received from the other device or until a predetermined amount of time has elapsed.

After the end of the advertise state period, the search state begins at block 40. At block 40, the device selects a channel and sends a probe request on the selected channel. The device can select a channel from social channels, for example. In another implementation, the device can select a channel from all channels in the wireless network, not from merely social channels. The probe request can be for example, an omnidirectional signal. After the probe request is transmitted, the device waits for probe responses from other devices. If no probe responses are received during the search state, the flow returns to block 32 to begin another advertise state. On the other hand, if a probe response is received during the search state (block 44), the flow proceeds to block step 46. At block 46, a user, application, etc. is be alerted that a device has been discovered. At block 48, it is determined whether the user, application, etc., would like to establish a connection with the discovered device. If it is determined that a connection is to be established, the flow proceeds to block 50 at which further action is taken to establish a connection. For example, in one implementation, a negotiation between the devices takes place to determine which device is to be the master. On the other hand, if, at block 48, it is determined that a connection is not to be established, the flow returns to block 32 to begin a new advertise state. Although the method 30 is described as toggling between an advertise state and a search state, multiple search states can occur in series. For example, after a search state ends, a device can continue with another search state corresponding to a different channel. Thus, for the occurrence of every advertise state, there may be a series of two or more search states, for example.

Although the process flow described above includes a device beginning in an advertise state, in general, a device may begin in any state such as in a search state or in a scan state as will be described in greater detail below.

In an ad hoc network, once two devices have discovered each other, for example using a method such as described with respect to FIG. 3 or any other suitable method, the two devices will negotiate to determine who will be the master. Example methods for negotiating to determine who will be the master will now be described.

Figure 4:
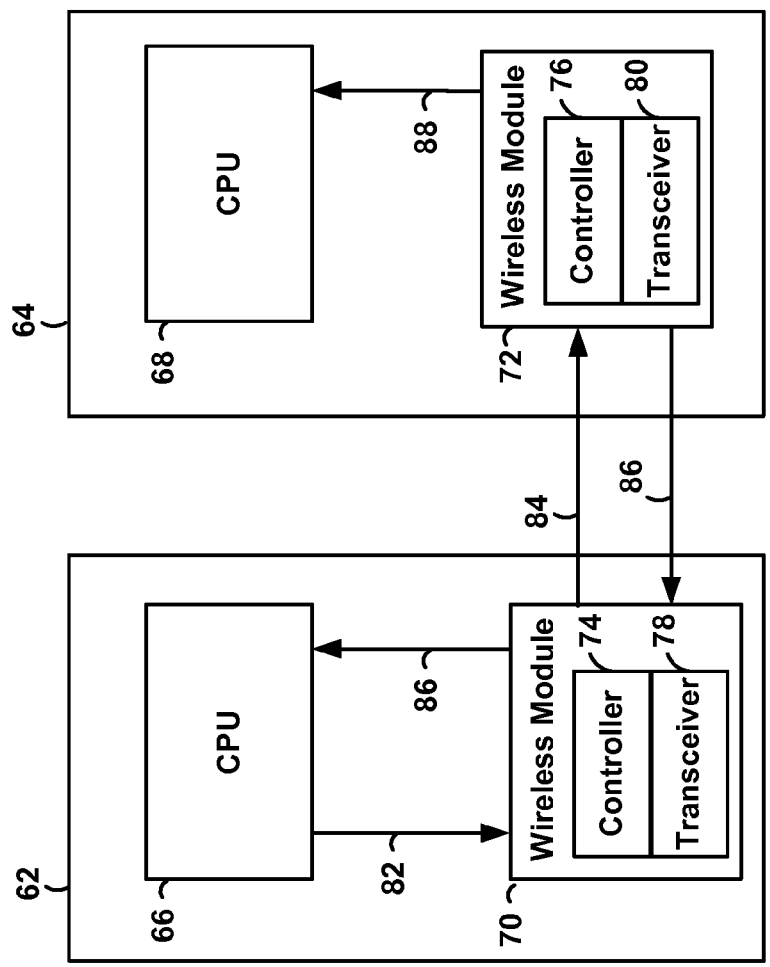
FIG. 4 is a block diagram of two devices performing a master negotiation process.
Figure 5:
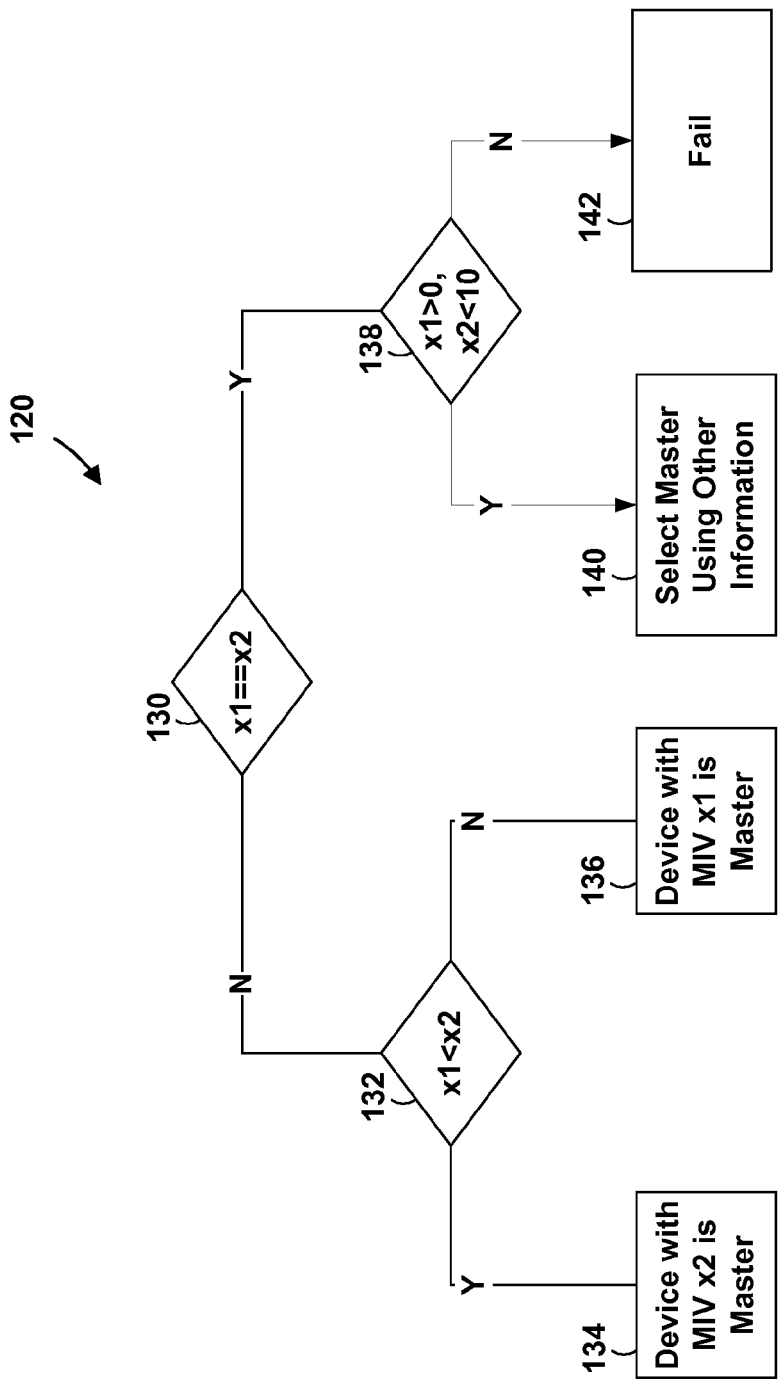
FIG. 5 is a flow diagram illustrating one example of a master negotiation process.
Figure 6:
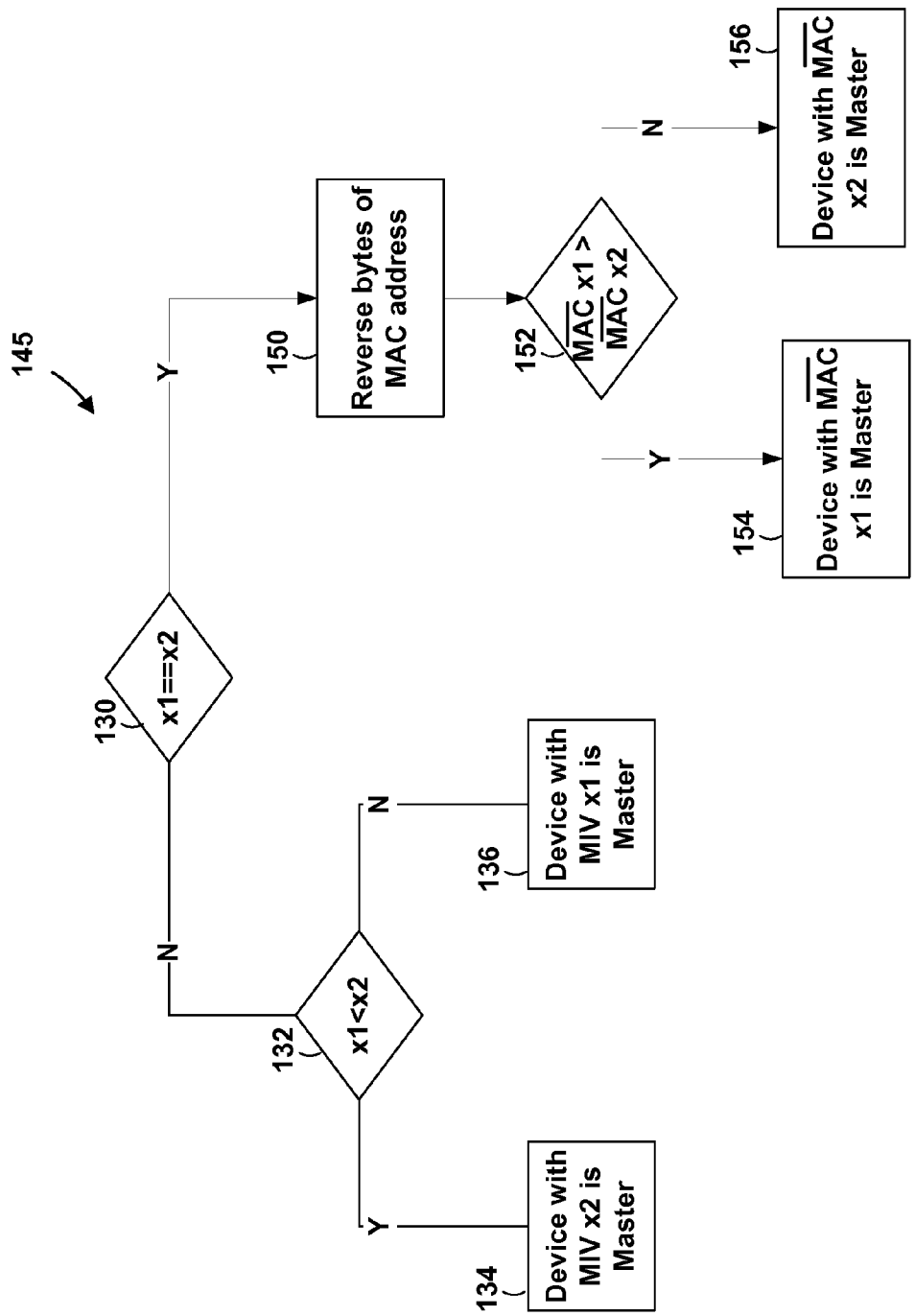
FIG. 6 is a flow diagram illustrating an alternative master negotiation process.

FIGS. 4-6 illustrate an example master negotiation process in greater detail. FIG. 4 is a block diagram illustrating two example devices 62, 64 in a master negotiation process. Each device 62, 64 respectively includes a central processing unit (CPU) 66, 68. Each CPU 66, 68 respectively includes or is coupled to a respective memory (not shown) to store instructions to be executed by the CPU 66, 68. Each device 62, 64 also includes a respective wireless module 70, 72. The wireless modules 70, 72 can be, for example wireless cards such as the wireless cards found in laptops, or any other suitable wireless module that can be used to transmit and receive information with another device. Each wireless module 70, 72 can include a respective controller 74, 76 coupled to respective transceivers 78, 80.

When a device has been discovered, CPU 66, which may execute instructions of an application or execute instructions to implement a user interface, sends a signal 82 to wireless module 70 causing the module 70 to begin master negotiations with the discovered device, in this example device 64. The controller 74 receives the signal 82 and, in response, causes the transceiver 76 to transmit a signal 84 to the device 64. The signal 84 includes information such as, for example, an MIV associated with the device 62. In response to the signal 84, the controller 76 causes the transceiver 80 to transmit a response signal 86. The response signal 86 includes, for example, an MIV associated with the device 64.

As described above, devices in a master negotiation may exchange MIVs which are used to decide which device has a higher priority in becoming a master. An MIV associated with a device can be in the form of a range of values indicating a priority for the device in becoming a master or a client. For example, an MIV can be selected from a range of possible values, where the range corresponds to different priorities for becoming a master. The range can include a value that indicates the device should always be a master (i.e., the device should never be a client), and can include a value that indicates the device should never be a master (i.e., the device should always be a client). In one example, the MIV for a device may be selected from the range [0, 1, 2, ..., 10], where 0 indicates the device should never be a master (i.e., should always be a client), and 10 indicates the device should always be a master (i.e., should never be a client). In this example, increasing MIVs correspond to an increasing priority that the device becomes a master. For instance, an MIV of 8 indicates a higher priority that the device becomes a master than an MIV of 7. Of course, different ranges may be utilized such as, for example. 0-15 or another suitable range. Larger ranges will provide finer granularity, whereas smaller ranges will provide courser granularity. In other implementations, increasing MIVs need not correspond to an increasing priority that the device becomes a master. For example, decreasing MIVs may correspond to an increasing priority that the device becomes a master. A device may be required to be a master or a client for various reasons. For example, a device with a short battery life, or a device that senses that its battery is running low may be prevented from becoming a master in order to conserve power. On the other hand, a user may decide that a device such as desktop computer or an access point should always be a master. An MIV for a device can be manually set by a user, pre-programmed by a vendor, or selected by an application being executed by a processor on the device, such as the CPU 66, 68, the controller 74, 76, etc.

Referring again to FIG. 4, the controller 74 receives the MIV for device 64 and compares the MIV of device 64 to the MIV of device 62. Based on the comparison of the MIVs, the controller 74 may determine if device 62 or device 64 will be the master. Alternatively, the CPU 66 determines which of devices 62, 64 will be the master. Similarly, the controller 76 may receive the MIV for device 62 and compares the MIV of device 64 to the MIV of device 62. Based on the comparison of the MIVs, the controller 76 can determine if device 62 or device 64 will be the master. Alternatively, the CPU 68 can determine which of devices 62, 64 will be the master. Once the devices 62, 64 finish the master negotiation process, the modules 70, 72 can notify the user, application, etc., for each device through respective signals 86, 88 to respective CPUs 66, 68.

FIG. 5 is a flow diagram of an example master negotiation method 120 after MIVs have been received. The method 120 may be implemented in hardware, software or firmware instructions executed by a processor or a combination thereof. For example, the process steps described below may be implemented entirely by either the controller within the wireless module or the CPU of each device or partially by both the wireless module and the CPU at each device. The method 120 will be described with reference to FIG. 4, for ease of explanation. However, the method 120 can be implemented by a suitable device other than the example devices 62, 64. After two devices such as devices 62, 64 of FIG. 5, have exchanged MIVs, the MIVs exchanged between the devices can be compared at each device. Thus, the method 120 can be implemented at each device. Referring to FIG. 5, at block 130, the MIV of device 62 of FIG. 5, designated $x1$, and the MIV of device 64, designated $x2$, are compared to determine if the values are equal. If it is determined that $x1$ and $x2$ are not equal then the flow proceeds to block 132. At block 132, $x1$ and $x2$ are compared to see which is greater. For example, $x1$ can be compared to $x2$. If it is determined that $x1$ is less than $x2$, the flow proceeds to block 134. At block 134, it is determined that device 64 should be designated the master. If at the block 132 it is determined that $x1$ is greater than $x2$, the flow proceeds to block 136. At block 136, device 62 is designated the master. If at block 130 it is determined that $x1$ equals $x2$, this corresponds to both devices having the same priority for becoming a master, and the flow proceeds to block 138. At block 138 it is determined whether $x1$ and $x2$ are equal to a mandatory client value or a mandatory master value. In one implementation, $x1$ is compared to the mandatory client value while $x2$ is compared to the mandatory master value. If the mandatory client value is zero and the mandatory master value is ten, it is determined whether $x1$ is greater than 0 and if $x2$ is less than 10. Other techniques for determining whether $x1$ and $x2$ are equal to a mandatory client value or a mandatory master value can be utilized. For example, $x1$ can be compared to the mandatory client value and the mandatory master value. Also, $x2$ can be compared to the mandatory client value and the mandatory master value. If it is determined that $x1$ and $x2$ do not correspond to the mandatory client value or the mandatory master value, the flow proceeds to block 140. At block 140, one of the devices is selected to be the master using information other than $x1$ and $x2$. For example, the device that was the first to send its MIV value to the other device may be set as the master. As another example, the device with a higher Media Access Control (MAC) address may be set as the master. In general, other techniques for selecting one of the devices to be the master using information other than $x1$ and $x2$ can be implemented. If at block 138 it is determined that $x1$ and $x2$ are equal to either the mandatory master value or the mandatory client value, the flow proceeds to block 142. At block 142, a failure condition is indicated. In a failure condition, a user, an application, etc., may be alerted. Also, the user, the application, etc., can be asked to change the MIV.

FIG. 6 is a flow diagram of another example master negotiation method 145. In FIG. 6, blocks 130, 132, 134 and 136 are the same as in FIG. 5 and will not be discussed further. If it is determined at block 130, that $x1$ and $x2$ are equal, the flow proceeds to block 150. At block 150, bytes in the MAC addresses of the two devices are reversed. For example, the order of the bits in the MAC address may be reversed, the order of the bytes in the MAC address may be reversed, the order of the hexadecimal digits in the MAC address may be reversed, etc. A MAC address is a unique identifier assigned to a device (e.g., by the manufacturer) for identification. The first three hexadecimal digits of a MAC address usually correspond to a number assigned to each manufacturer. The following three or five hexadecimal digits are assigned by the manufacturer, and may appear to be semi-random. Thus, if the MAC addresses were not reversed a device made by one manufacturer would always be chosen over the device made by another manufacturer. By reversing the MAC addresses, the numbers being compared are more random-looking. At block 152, the reverse MAC addresses are compared. If the reverse MAC address of device 62 is greater than the reverse MAC address of device 64, the flow proceeds to block 154, at which device 62 is determined to be the master. If at block 152 it is determined that the reverse MAC address of device 64 is greater than the reverse MAC address of device 62, the flow proceeds to block 156, at which device 64 is designated the master. In an alternate implementation, the device with a lower reverse MAC address is set to the master. Thus, more generally, the comparison of the reverse MAC addresses is used to determine which device will be the master.

Figure 7:
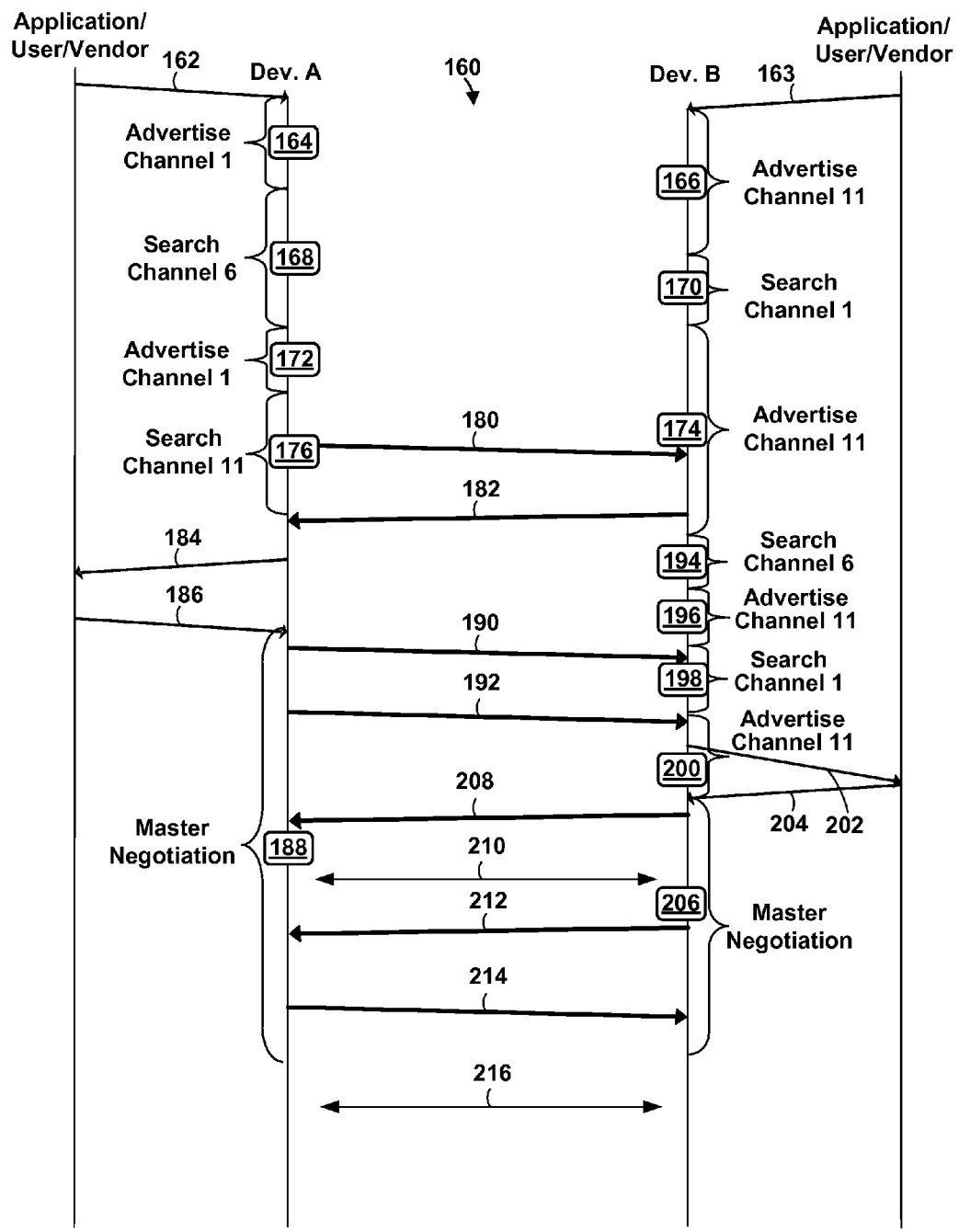
FIG. 7 is an example timing diagram illustrating two devices establishing a connection.

FIGS. 7-11 are example signaling diagrams showing wireless communications between two devices (e.g., device A and device B in FIG. 7). The signaling diagrams of FIGS. 7-11 also show exchanges between an application, a user, etc., and a device (e.g., device A). Referring now to FIG. 5 and FIGS. 7-11, signals exchanged between the application, user, etc., and the device (e.g., device A, device B, etc.) in FIGS. 7-11 can correspond to signals being exchanged between a CPU (e.g., CPU 66) and a wireless module (e.g., wireless module 70). For example, in FIG. 7, a signal sent from a user, for example, to device A corresponds to data received from a user via a user interface implemented by the CPU 66 and then sent to the wireless module 70. As another example, an application executed by the CPU 66 can send a signal to the wireless module 70. Similarly, the wireless module 70 can send a signal to the CPU 66, and the CPU 66 may present data from the signal to a user via a user interface, a display, etc. As another example, the wireless module 70 may send a signal to an application being executed by the CPU 66. The application could be an application supplied by a vendor of the device 62, a third party application, etc.

Referring now to FIG. 7, a signal timing diagram 160 shows an example of two devices operating on different channels discovering each other. Device A is shown operating on channel 1 while device B is shown operating on channel 11. Each of the devices can receive a respective discover probe 162, 163 to begin an advertise state. The discover probes 162, 162 can be set based on the application being run, based on an input from a user, or based on a preset condition set by a vendor. For example, a vendor may preset the device to automatically start in an advertise state once the device is turned on. In another example, an application can generate a probe request when the application first starts, or upon a trigger when the application is running. When each device receives the respective discover probe 162, 163 the device can begin the advertise state on its own social channel listening for other devices. Although the devices are described here as starting in an advertise state, the devices can be set to start in a search state or, as will be described further below, the devices can start scanning all channels for legacy access points or legacy clients.

Referring again to FIG. 7, at states 164, 166 device A and device B, respectively, each begin respective advertising states for randomly/pseudo-randomly determined amounts of time. During the advertise state, each device may wait for a probe request from any devices that may be in range. In the example of FIG. 7, since neither device receives a probe request during the advertise state, the devices then switch to respective search states such as shown at state 168 and state 170 for device A and device B, respectively. Device A, at state 168, searches on social channel 6 for any devices in the area that may be advertising on channel 6 at the same time. In other words, device A transmits probe requests on channel 6. Since device A does not receive any probe response during state 168, device A determines that there are no devices in the area currently advertising on channel 6. Device A then switches to the advertise state 172 on its own social channel. Although device A is shown alternating between a search state and an advertise state, each of the devices can be set or programmed to change states according to a different pattern. A device can have a set sequence selected by a user, preprogrammed by a vendor, set by an application, etc., or a device can randomly switch between advertising and searching on different channels. For example, device A can switch to searching channel 11 after state 168 instead of advertising on channel 1.

At state 170, device B searches on social channel 1 (i.e., sends probe requests on channel 1). While device B is searching on the operational channel of device A, a device within the network, device B does not receive a probe request from device A since device A is searching on a different social channel at the time of search state 170. Therefore, device A cannot "hear" the probe request from device B. After state 170 is over, device B switches to the advertise state 174 on its own social channel, channel 11.

At state 176, device A has switched to searching on social channel 11. Since device A is searching on channel 11 and device B is advertising on channel 11 at the same time, the devices discover each other. In other words, device A sends a probe request 180 and device B hears the probe request 180. In response to the probe request 180, device B transmits a probe response 182 back to device A.

As described above, a probe request and a probe response can contain information about the devices themselves, which may be referred to as an information element (IE). The IEs can include information useful to the other device, such as the channel that a device is operating on, the type of device, etc. Of course the probe request and responses can include other IEs not explicitly described here.

Device A upon receiving the probe response 182 may alert a user, application, etc., with a notice 184 that a device was discovered. The user, application, etc., may confirm receipt of the notice 184 and allow the device to continue establishing a connection. Alternatively, a vendor may pre-program the device to automatically accept all notices upon receipt and begin a master negotiation process. The vendor may also pre-program a device to accept only responses that come from a specific type of device, or only from devices operating on a specific channel. If device A will continue establishing a connection, a response 186 is sent to device A. The device A may switch to a master negotiation state 188.

Device A then sends a master negotiation request 190 to device B. The master negotiation request can include IEs such an MIV if an MIV was not previously sent during the probe request. Device A then waits a predetermined amount of time for a master negotiation response. If, after an amount of time, device A has not received a master negotiation response, it is determined that device B, the previously discovered device, is not in a state ready to receive any requests. In this case, device A can send another master negotiation request 192 to device B and again wait for a response. This can continue a plurality of times until device A receives a response or until device A decides to stop attempting to negotiate with device B. In such cases, device A can return to its advertise and search states as described above and look for another device with which to connect.

Meanwhile, device B, after sending a probe response 182 continues trying to discover other devices within the network with which to connect while waiting for a response from the first discovered device. As shown in the example of FIG. 7, device B, after sending probe response 182, begins searching on channel 6 at state 194. If device B finds a device advertising on channel 6 device B sends a probe request (similar to device A at state 176) and waits for a probe response. In the example of FIG. 7, however, device B does not find any other devices, device B switches at state 196 to the advertise state on its own social channel, channel 11. Since no requests are made, at state 198, device B switches to the search state and searches again for any other devices on channel 1. Again, since no devices are found, device B, at state 200, switches to the advertise state on its own social channel once again. At this point, since device B is in an advertise state, device B can receive the master negotiation request 192 from device A. Device B then sends a notification 202 to a user, an application, check a vendor's pre-programmed response as described above, etc. If device B tries to connect with device A, a response 204 is sent to device B allowing the device to begin master negotiations with device A. Device B then switches to a master negotiation state 206 and sends a master negotiation response 208 to device A. Similar to the master negotiation requests 190, 192 from device A, the master negotiation response 208 can include IEs such as an MIV associated with device B. Now that both devices are engaged in a master negotiation request, a master negotiation process, such as the process described in FIGS. 4-6 can begin.

Once the master client negotiations have concluded, a wireless provisioning service (WPS) 210 can occur between the two devices. WPS 210 is generally well known in the art and will not be described in detail. During WPS 210, the master may request that the client communicate using the master's social channel or on a completely different operating channel. In the example of FIG. 7, device B has been designated the master during the master negotiation process. Device B can then make a request 212 to device A to communicate on another operating channel. The channel may be located on the same frequency band on which device B was advertising, or may be located on a different channel. Device B may then wait for a confirmation from device A before switching to and beginning to communicate on the designated operating channel. Device A, after being designated a client may wait for an operating channel request 212 from device B, the master. Once device A receives the request 212, device A sends a confirmation 214 to device B and begins communications 216 on the requested operating channel.

Figure 8:
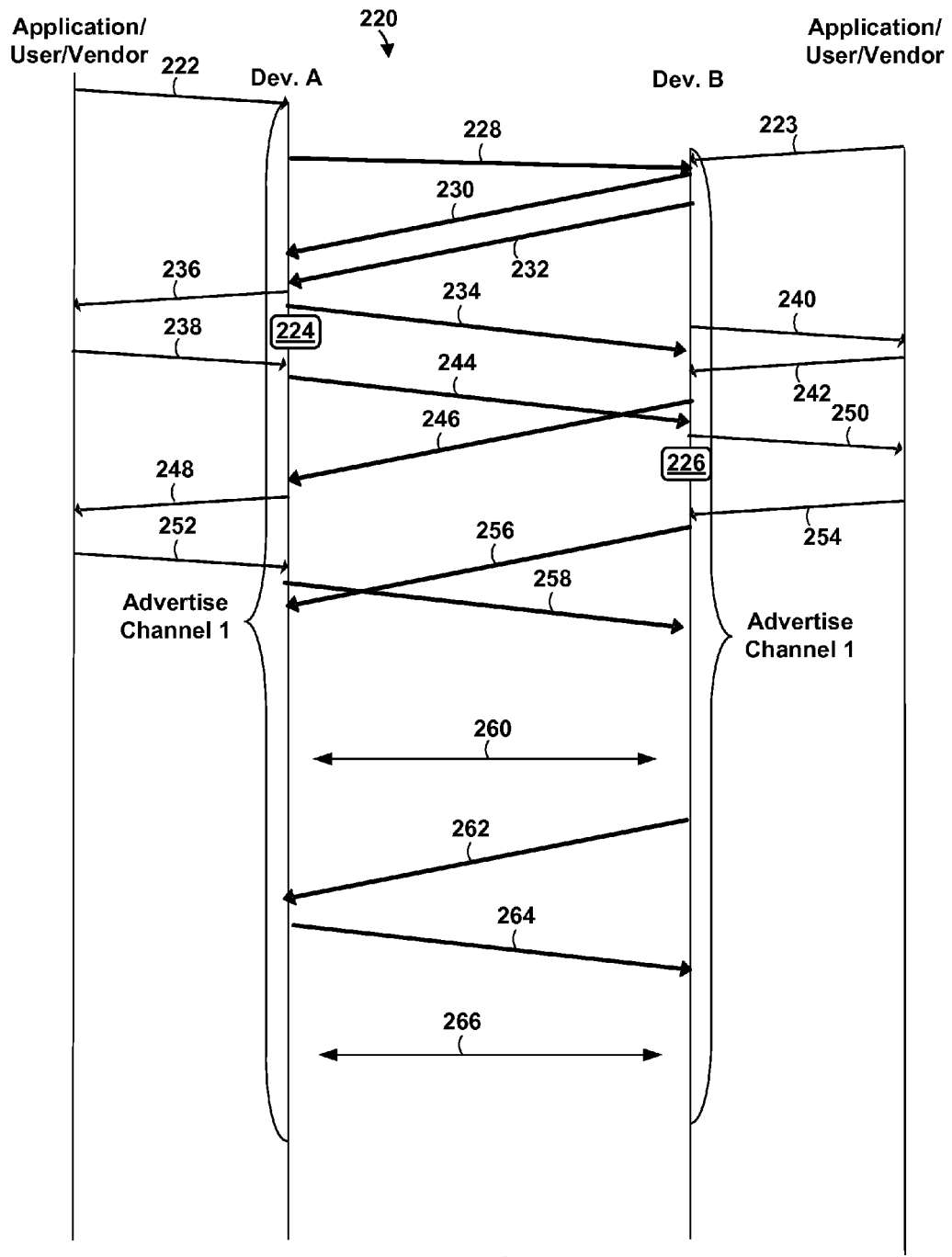
FIG. 8 is another example timing diagram illustrating two devices establishing a connection.

FIG. 8 is an example timing diagram 220 showing a negotiation between two devices A and B, such as devices 20 and 22 of FIG. 1, to discover each other. Similar to the example of FIG. 7, each of devices A and B may receive respective discover probes 222, 223 alerting the devices to begin an advertise and/or search state. Similar to the example of FIG. 7, the discover probe 222 may be set based on the application being run, based on an input from a user, based on a preset condition set by a vendor, etc. When each device receives a discover probe 222, 223, the device may begin an advertise state on its social channel, channel 1 at states 224, 226 for device A and device B respectively. For example, as shown in FIG. 8, device A receives a discover probe 222 first and begins advertising at state 224 on social channel 1. A short time later, device B receives a discover probe 223 and begins advertising at state 226 on social channel 1. When device B begins advertise state 226, device A, already in an advertise state, sends a probe request 228. Device B may respond to the probe request 228 with a probe response 230. Device B, can also send a probe request 232 to device A. Device A, upon receiving probe request 232 responds with probe response 234.

Meanwhile, after receiving probe response 230, device A can send a notification 236 to the application, the user, check a preset response set by a vendor, etc. As described above, the application, user, etc., can decide to initiate the creation of a network with the discovered device and send an initiation response 238. Device B, similarly sends a notification 240 to the application, user, etc., and receives an initiation response 242 from the application, user, etc., to initiate a master negotiation process. Master negotiation requests 244, 246 which can include MIVs associated with each device A and B respectively, are sent upon receipt of the initiation responses 238, 242. When device A receives master negotiation request 246 and B receives master negotiation request 244, each of device A and B sends to their own user, application etc., a notification of negotiation request 248, 250, respectively. Each of the devices A and B's applications, users, etc., may send separate responses 252, 254, respectively, agreeing to begin a master negotiation process. Upon receipt of signal 254 device B sends a master negotiation response 256 to device A. Similarly, device A also sends a master negotiation response 258 to device B upon receipt of signal 252.

Once the master negotiation responses 256, 258 are received by devices A and B respectively, the devices may perform a master negotiation process such as described above in relation to FIGS. 4-6, using MIVs included in the IEs of the master negotiation responses 256, 258. Once a master client relationship has been developed a WPS provisioning process 260 may occur. The master, in this example device B, may then send a request 262 to the client, device A, including a requested operating channel. Device A, the client, may then send a confirmation 264 to device B. The devices may then begin communication on the operating channel at 266.

In the examples discussed above with respect to FIGS. 8 and 9, one or both of devices A and B may first perform a scanning procedure looking for infrastructure and ad hoc networks according to another procedure, such as a scanning procedure set forth in the IEEE 802.11 standards. If another infrastructure or ad hoc network is not found during this scanning process, the device may then proceed to utilize the method for finding another device such as described above with respect to FIGS. 3, 8 and 9. If another ad hoc device is discovered during this scanning process, the device may seek to enter a master negotiation with the other device by utilizing a method to negotiate who will be the master such described above with respect to FIGS. 5 and 6.

Figure 9:
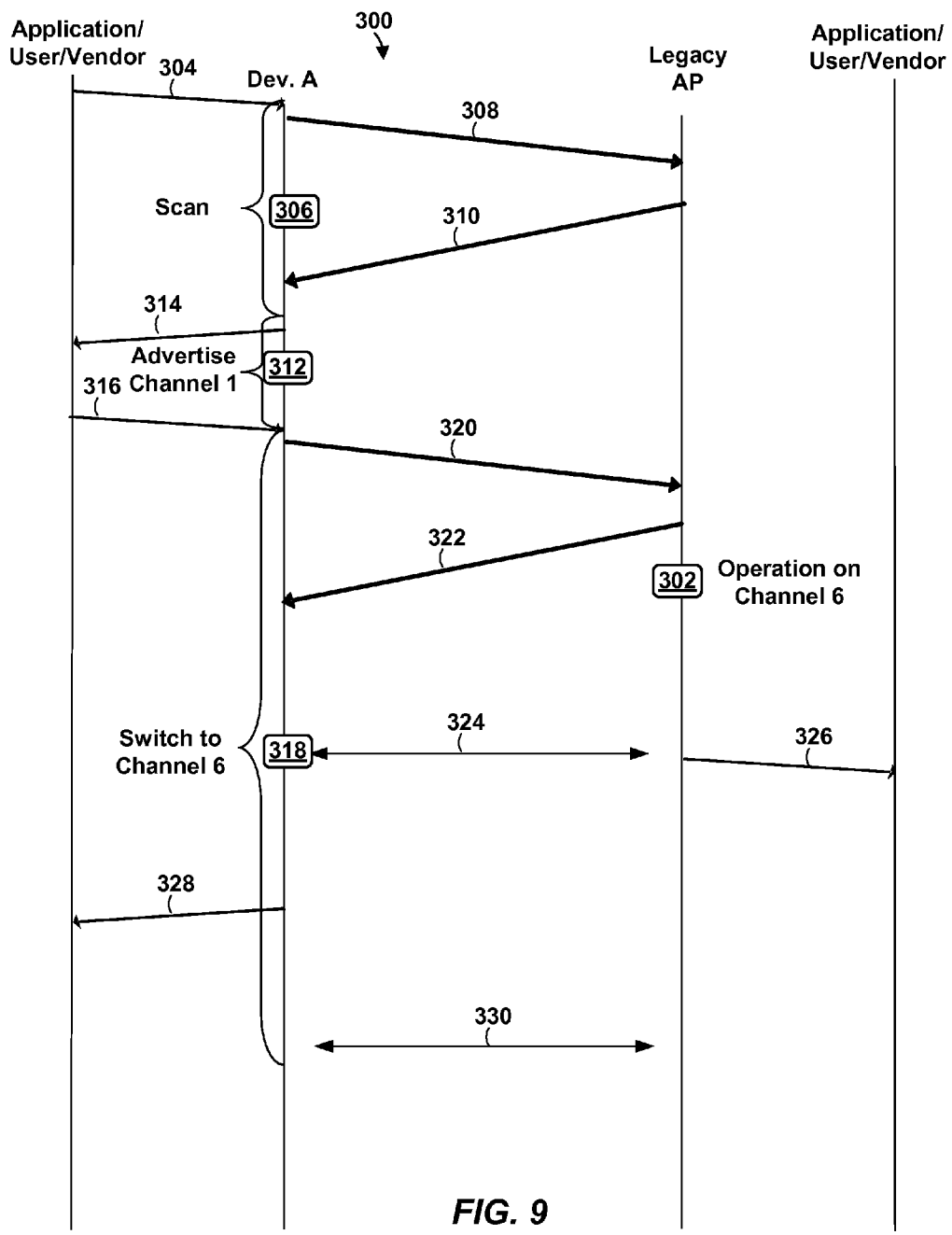
FIG. 9 is yet another example timing diagram illustrating two devices establishing a connection.

FIG. 9 is an example timing diagram 300 in which a P2P device, device A, such as device 20 of FIG. 1 and a legacy access point (AP) negotiate to establish a connection. In the example of FIG. 9, device A is configured to implement a method for finding other devices such as the example method of FIG. 3, where as the legacy AP is not configured to implement such a method. On the other hand, both of device A and the legacy AP are configured to implement a scanning method such as a scanning method set forth in the IEEE 802.11 standards. In the example of FIG. 9, the legacy AP operates on channel 6. Device A, upon receipt of a signal 304 indicating that device A is to begin discovering other devices, begins a scan state 306, which may be configured to implement a scanning method set forth in the IEEE 802.11 standards. During the scan state 306, device A discovers the legacy AP and sends a probe request 308 to the legacy AP. The legacy AP responds with a probe response 310.

After the scan state 306, which may be set for a predetermined amount of time, for example, device A starts an advertise and search process such as described above with respect to FIG. 3. For example, device A may begin in an advertise state 312, on channel 1. Meanwhile an application, user, etc., may be sent a notification 314 that another device was found during the scan state 306. The application, user, etc., may cause an initiate join signal 316 to be sent to device A causing device A to switch to channel 6, the channel of the legacy AP, at state 318. Device A sends an association request 320 to the legacy AP on channel 6. Legacy AP, in response, sends an association response 322 and WPS provisioning 324 occurs. The legacy AP, upon finishing the WPS provisioning 324 may send a notification 326 to an application, user, etc., indicating that there is a new device associated with the legacy AP. Similarly, device A may send to an application, user, etc., a notification 328 that indicates device A has joined a network with the legacy AP. Data transfer 330 between the two devices may then begin.

Figure 10:
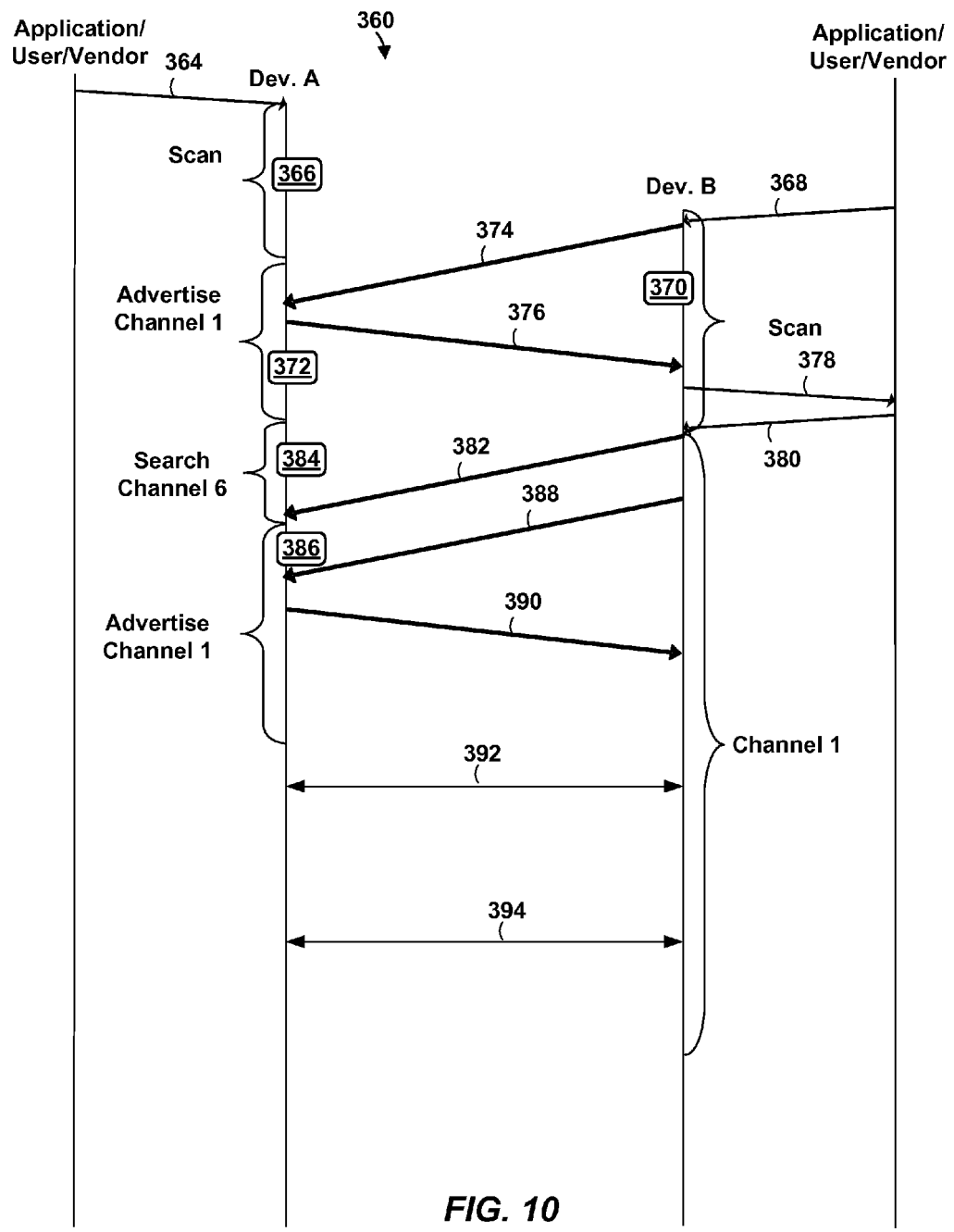
FIG. 10 is still another example timing diagram illustrating two devices establishing a connection.

FIG. 10 is an example timing diagram 360 in which a P2P device, device A, and a legacy device B negotiate to establish a connection. In the example of FIG. 10, device A is configured to implement a method for finding other devices such as the example method of FIG. 3, where as the legacy device B is not configured to implement such a method. On the other hand, both device A and device B are configured to implement a scanning method such as a scanning method set forth in the IEEE 802.11 standards. Device A, upon receipt of a signal 364 indicating that device A is to begin discovering other devices, begins a scan state 366, which may be configured to implement a scanning method such as set forth in the IEEE 802.11 standards. Device B, upon receipt of a signal 368 indicating that device B is to begin discovering other devices, begins a scan state 370, which may be configured to implement a scanning method such as set forth in the IEEE 802.11 standards. Subsequently, device A transitions to an advertise state 372 operating on channel 1. Device B transmits a probe request signal 374 on Channel 1 and the signal is received by device A during the advertise state 372. In response to the signal 374, device A transmits a probe response 376. The probe response 376 may include information for establishing a connection such as robust secure network (RSN) information and WPS information.

Upon receiving the probe response 376, device B sends a notification 378 that an AP was found during the scan state 370 to an application, user, etc. The application, user, etc., sends a join signal 380 to device B, which in turn causes device B to switch to channel 1 and to transmit to device A an association request signal 382. In the meantime, device A has transitioned to a search state 384 on channel 6. Thus, device A does not "hear" the signal 382. Later, device A transitions to an advertise state 386 on channel 1. Device B resends an association request 388, which device A now receives. In response to the association request 388, device A transmits an association response 390. Subsequently, WPS provisioning 392 occurs. Data transfer 394 between the two devices can then begin.

Figure 11:
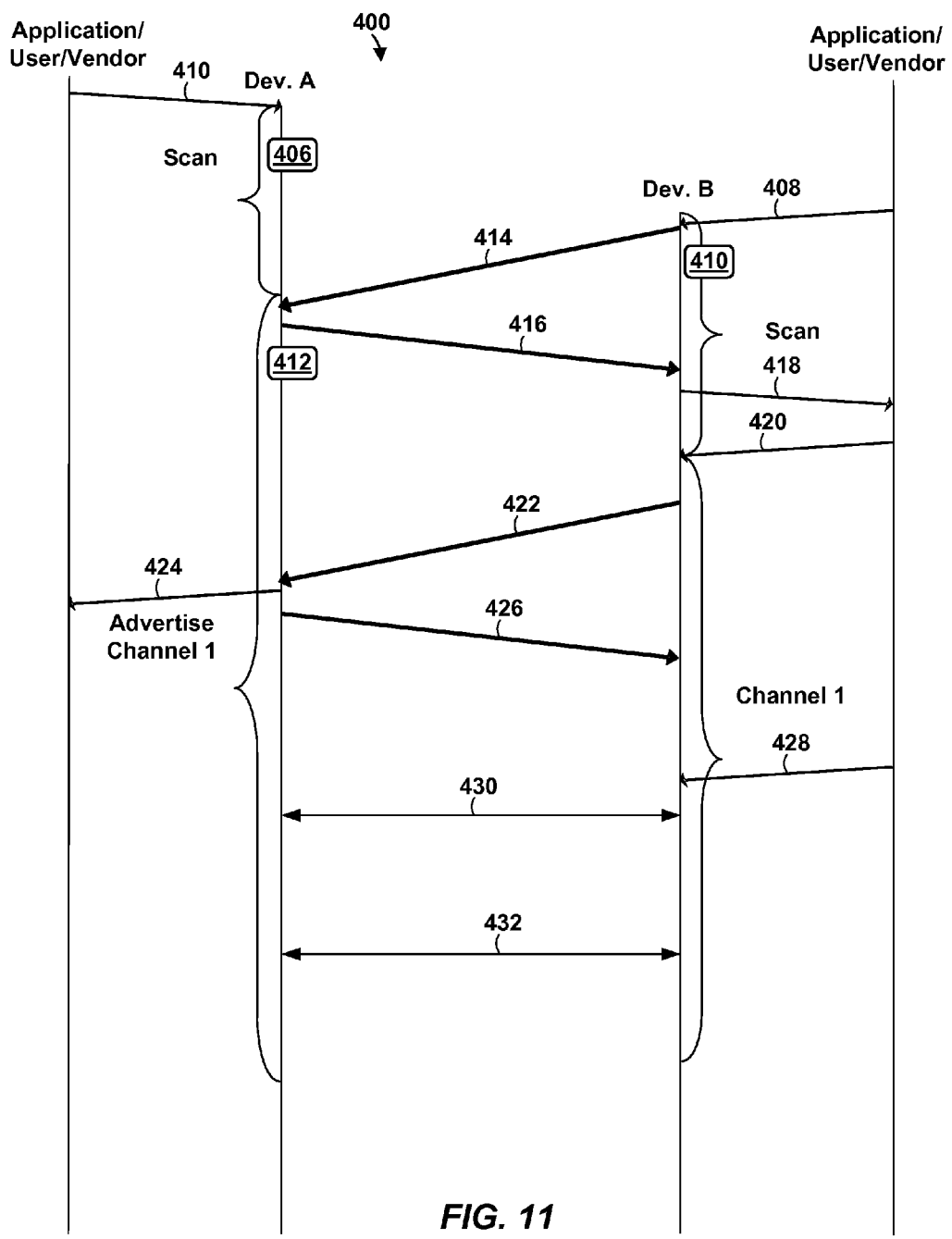
FIG. 11 is yet another example timing diagram illustrating two devices establishing a connection.

FIG. 11 illustrates an example timing diagram 400 in which a device, device A, is discovered by a legacy client that does not support WPS provisioning but supports the wi-fi protected access-2 (WPA-2) standard. The WPA-2 standard is generally well known to those of ordinary skill in the art and will not be described further here. In general, the process in which device A and the legacy client discover each other in the example of FIG. 11 is similar to those described above. A difference, however, occurs in that a WPA-2 message exchange occurs rather than WPS provisioning. In the example of FIG. 11, device A is configured to implement a method for finding other devices such as the example method of FIG. 3, whereas the legacy device B is not configured to implement such a method. On the other hand, both device A and device B are configured to implement a scanning method such as a scanning method set forth in the IEEE 802.11 standards. Device A, upon receipt of a signal 404 indicating that device A is to begin discovering other devices, begins a scan state 406, which can be configured to implement a scanning method such as set forth in the IEEE 802.11 standards. Device B, upon receipt of a signal 408 indicating that device B is to begin discovering other devices, begins a scan state 410, which can be configured to implement a scanning method such as set forth in the IEEE 802.11 standards. Subsequently, device A transitions to an advertise state 412 operating on channel 1. Device B transmits a probe request signal 414 on Channel 1 and the signal 414 is received by device A during the advertise state 412. In response to the signal 414, device A transmits a probe response 416. The probe response 416 can include information for establishing a connection such as RSN information and WPS information.

Upon receiving the probe response 416, device B sends a notification 418 that an AP was found during the scan state 410 to an application, user, etc. The application, user, etc., sends a join signal 420 to device B, which in turn causes device B to switch to channel 1 and to transmit to device A an association request signal 422. In response to the association request 422, device A transmits to an application, a user, etc. a signal 424 indicating that a legacy client without WPS was found during the advertise state 412. Also in response to the association request 422, device A transmits an association response 426.

An application, user, etc., provides a WPA-2 passphrase 428, and a WPA-2 message exchange 430 occurs between device A and device B. Data transfer 432 between the two devices can then begin.

Although FIGS. 3-11 were described in the context of two devices communicating with each other, the techniques described above can be utilized in various network scenarios involving more that two devices, such as in mesh-type networks, networks with a central point, etc.

Referring now to FIGS. 3-6, the example methods of FIGS. 3, 5 and 6 may be implemented by a device such as the device 62 of FIG. 4. For example, at least some of the blocks of FIG. 3 may be implemented by the wireless module 70. For instance, at least some of the blocks of FIG. 3 may be implemented by the controller 74. Similarly, at least some of the blocks of FIGS. 5 and 6 may be implemented by the wireless module 70. For instance, at least some of the blocks of FIGS. 5 and 6 may be implemented by the controller 74.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this disclosure, which would still fall within the scope of the claims.

What is claimed is:

1. A first communication device, comprising:
a wireless communication module including:
a transceiver, and
a hardware controller device configured to:
cause the wireless communication module to listen, during advertise states of the first communication device, for probe requests from one or more second communication devices on a first channel included in a plurality of channels, wherein at least some respective lengths of the advertise states of the first communication device are different,
when one or more first probe requests are received from the one or more second communication devices during the advertise states of the first communication device, cause the wireless communication module to transmit one or more first probe responses responsive to the one or more first probe requests,
cause the wireless communication module to select second channels from the plurality of channels for use during search states of the first communication device, wherein the second channels are different than the first channel,
cause the wireless communication module to transmit second probe requests on respective second channels during respective search states of the first communication device, and
cause the wireless communication module to listen, during the search states, for one or more second probe responses on the second channels.

2. The first communication device of claim 1, wherein the hardware controller device is configured to determine the at least some respective lengths of the advertise states of the first communication device so that the at least some respective lengths of the advertise states vary randomly or pseudo-randomly.

3. The first communication device of claim 1, wherein:
the search states of the first communication device have respective lengths; and
at least some respective lengths of the search states of the first communication device are different.

4. The first communication device of claim 3, wherein the hardware controller device is configured to determine the at least some respective lengths of the search states of the first communication device so that the at least some respective lengths of the search states of the first communication device vary randomly or pseudo-randomly.

5. The first communication device of claim 1, wherein the hardware controller device is configured to cause the wireless communication module to commence a negotiation with one of the second communication devices after at least one of (i) receiving one probe request from the one second communication device, or (ii) receiving one second probe response from the one second communication device,
wherein the negotiation is for determining whether the first communication device or the one second communication device will be a master in a peer-to-peer network comprising the first communication device and the one second communication device.

6. The first communication device of claim 5, wherein the hardware controller device is configured to, during the negotiation with the one second communication device, cause the wireless communication module to:
compare (i) a first value indicative of a priority for the first communication device to become the master with (ii) a second value indicative of a priority for the one second communication device to become the master, wherein
(a) the second value is received from the second communication device,
(b) the first value is configurable and non-unique, and
(c) the second value is configurable and non-unique,
determine whether the first communication device or the second communication device is to become the master based on the comparison of the first value with the second value.

7. The first communication device of claim 6, wherein the hardware controller device is configured to, during the negotiation with the one second communication device, cause the wireless communication module to
select the first communication device to become the master in response to the first value indicating a higher priority than the second value, and
select the second communication device to become the master in response to the second value indicating a higher priority than the first value.

8. The first communication device of claim 6, further comprising a processor communicatively coupled to the wireless module,
wherein the first value is received by the wireless module from the processor.

9. The first communication device of claim 6, wherein:
the first value is selected from a set of integers consisting of [0, 1, 2, 3, 4, 5, 6, 7, 8, 9, 10, 11, 12, 13, 14, 15]; and
the second value is selected from the set of integers consisting of [0, 1, 2, 3, 4, 5, 6, 7, 8, 9, 10, 11, 12, 13, 14, 15].

10. The first communication device of claim 6, wherein the hardware controller device is configured to cause the wireless module to transmit the first value to the one second communication device.

11. A system, comprising:
a first communication device, comprising:
a first wireless communication module including
a first transceiver, and
a first hardware controller device configured to
cause the first wireless communication module to listen, during advertise states of the first communication device, for probe requests on a first channel included in a plurality of channels, wherein at least some respective lengths of the advertise states of the first communication device are different,
when a first probe request is received during any of the advertise states of the first communication device, cause the first wireless communication module to transmit a first probe response responsive to the first probe request,
cause the first wireless communication module to select second channels from the plurality of channels for use during search states of the first communication device, wherein the second channels are different than the first channel,
cause the first wireless communication module to transmit second probe requests on respective second channels during respective search states of the first communication device, and
cause the first wireless communication module to listen, during the search states of the first communication device, for one or more second probe responses on the second channels;
wherein the system further comprises a second communication device, the second communication device comprising:

a second wireless communication module including
   a second transceiver, and
   a second hardware controller device configured to
      cause the second wireless communication module to listen, during advertise states of the second communication device, for probe requests on a third channel included in a plurality of channels, wherein at least some respective lengths of the advertise states of the second communication device are different,
      when a third probe request is received during any of the advertise states of the second communication device, cause the second wireless communication module to transmit a third probe response responsive to the third probe request,
      cause the second wireless communication module to select fourth channels from the plurality of channels for use during search states of the second communication device, wherein the fourth channels are different than the third channel,
      cause the second wireless communication module to transmit fourth probe requests on respective fourth channels during respective search states of the second communication device, and
      cause the second wireless communication module to listen, during the search states of the second communication device, for one or more fourth probe responses on the fourth channels.

12. The system of claim 1, wherein:
the first hardware controller device is configured to determine the at least some respective lengths of the advertise states of the first communication device so that the at least some respective lengths of the advertise states of the first communication device vary randomly or pseudo-randomly; and
the second hardware controller device is configured to determine the at least some respective lengths of the advertise states of the second communication device so that the at least some respective lengths of the advertise states of the second communication device vary randomly or pseudo-randomly.

13. The system of claim 11, wherein:
the search states of the first communication device have respective lengths;
at least some respective lengths of the search states of the first communication device are different;
search states of the second communication device have respective lengths;
at least some respective lengths of the search states of the second communication device are different.

14. The system of claim 13, wherein:
the first hardware controller device is configured to determine the at least some respective lengths of the search states of the first communication device so that the at least some respective lengths of the search states of the first communication device vary randomly or pseudo-randomly; and
the second hardware controller device is configured to determine the at least some respective lengths of the search states of the second communication device so that the at least some respective lengths of the search states of the second communication device vary randomly or pseudo-randomly.

15. The system of claim 11, wherein:
the first hardware controller device is configured to cause the first wireless communication module to commence a negotiation with the second communication device after at least one of (i) receiving one probe request from the second communication device, or (ii) receiving one second probe response from the second communication device,
the second hardware controller device is configured to cause the second wireless communication module to commence a negotiation with the first communication device after at least one of (i) receiving one probe request from the first communication device, or (ii) receiving one second probe response from the first communication device, and
wherein the negotiation is for determining whether the first communication device or the second communication device will be a master in a peer-to-peer network comprising the first communication device and the second communication device.

16. The system of claim 15, wherein:
the first hardware controller device is configured to, during the negotiation with the second communication device, cause the first wireless communication module to:
   compare (i) a first value indicative of a priority for the first communication device to become the master with (ii) a second value indicative of a priority for the second communication device to become the master, wherein
      (a) the second value is received from the second communication device,
      (b) the first value is configurable and non-unique, and
      (c) the second value is configurable and non-unique,
   determine whether the first communication device or the second communication device is to become the master based on the comparison, by the first wireless communication module, of the first value with the second value; and
the second hardware controller device is configured to, during the negotiation with the first communication device, cause the second wireless communication module to:
   compare (i) the first value indicative of the priority for the first communication device to become the master with (ii) the second value indicative of the priority for the second communication device to become the master, wherein the first value is received from the first communication device, and
   determine whether the first communication device or the second communication device is to become the master based on the comparison, by the second wireless communication module, of the first value with the second value.

17. The system of claim 16, wherein:
the first hardware controller device is configured to, during the negotiation, cause the first wireless communication module to
   select the first communication device to become the master in response to the first value indicating a higher priority than the second value, and
   select the second communication device to become the master in response to the second value indicating a higher priority than the first value; and
the second hardware controller device is configured to, during the negotiation, cause the second wireless communication module to
   select the first communication device to become the master in response to the first value indicating a higher priority than the second value, and select the second communication device to become the master in response to the second value indicating a higher priority than the first value.

18. The system of claim 16, further comprising:
a first processor communicatively coupled to the first wireless module, wherein the first value is received by the first wireless module from the first processor,
a second processor communicatively coupled to the second wireless module, wherein the second value is received by the second wireless module from the second processor.

19. The system of claim 16, wherein:
the first value is selected from a set of integers consisting of [0, 1, 2, 3, 4, 5, 6, 7, 8, 9, 10, 11, 12, 13, 14, 15]; and
the second value is selected from the set of integers consisting of [0, 1, 2, 3, 4, 5, 6, 7, 8, 9, 10, 11, 12, 13, 14, 15].

20. The system of claim 16, wherein:
the first hardware controller device is configured to cause the first wireless module to transmit the first value to the second communication device; and
the second hardware controller device is configured to cause the second wireless module to transmit the second value to the first communication device.

21. A method, comprising:
listening, at a first communication device, for probe requests from one or more second communication devices on a first channel included in a plurality of channels during advertise states of the first communication device, wherein at least some respective lengths of the advertise states of the first communication device are different;
when one or more first probe requests are received from the one or more second communication devices during the advertise states of the first communication device, transmitting, with the first communication device, one or more first probe responses responsive to the one or more first probe requests;
selecting, at the first communication device, second channels from the plurality of channels for use during search states of the first communication device, wherein the second channels are different than the first channel;
transmitting, with the first communication device, second probe requests on respective second channels during respective search states of the first communication device; and
listening, at the first communication device, for one or more second probe responses on the second channels during the search states of the first communication device.

22. The method of claim 21, further comprising determining, at the first communication device, the at least some respective lengths of the advertise states of the first communication device so that the at least some respective lengths of the advertise states vary randomly or pseudo-randomly.

23. The method of claim 21, wherein:
the search states of the first communication device have respective lengths; and
at least some respective lengths of the search states of the first communication device are different.

24. The method of claim 23, further comprising determining, at the first communication device, the at least some respective lengths of the search states of the first communication device so that the at least some respective lengths of the search states of the first communication device vary randomly or pseudo-randomly.

25. The method of claim 21, further comprising commencing, at the first communication device, a negotiation with one of the second communication devices after at least one of (i) receiving one probe request from the one second communication device, or (ii) receiving one second probe response from the one second communication device,
wherein the negotiation is for determining whether the first communication device or the one second communication device will be a master in a peer-to-peer network comprising the first communication device and the one second communication device.

26. The method of claim 25, further comprising:
comparing, at the first communication device, (i) a first value indicative of a priority for the first communication device to become the master with (ii) a second value indicative of a priority for the one second communication device to become the master, wherein
(a) the second value is received from the second communication device,
(b) the first value is configurable and non-unique, and
(c) the second value is configurable and non-unique; and
determining, at the first communication device, whether the first communication device or the second communication device is to become the master based on the comparison of the first value with the second value.

27. The method of claim 26, further comprising:
selecting, at the first communication device, the first communication device to become the master in response to the first value indicating a higher priority than the second value; and
selecting, at the first communication device, the second communication device to become the master in response to the second value indicating a higher priority than the first value.

28. The method of claim 26, further comprising receiving the first value from a processor communicatively coupled to the wireless module.

29. The method of claim 26, wherein:
the first value is selected from a set of integers consisting of [0, 1, 2, 3, 4, 5, 6, 7, 8, 9, 10, 11, 12, 13, 14, 15]; and
the second value is selected from the set of integers consisting of [0, 1, 2, 3, 4, 5, 6, 7, 8, 9, 10, 11, 12, 13, 14, 15].

30. The method of claim 26, further comprising transmitting, with the first communication device, the first value to the one second communication device.

* * * * *